United States Patent
Wiltzius

(10) Patent No.: US 9,129,116 B1
(45) Date of Patent: Sep. 8, 2015

(54) SYSTEM AND METHOD FOR INDICATING SECURITY

(75) Inventor: Thomas Christian Wiltzius, Santa Barbara, CA (US)

(73) Assignee: Google Inc., Mountain View, CA (US)

( * ) Notice: Subject to any disclaimer, the term of this patent is extended or adjusted under 35 U.S.C. 154(b) by 218 days.

(21) Appl. No.: 13/445,246

(22) Filed: Apr. 12, 2012

(51) Int. Cl.
*G06F 11/00* (2006.01)
*G06F 21/57* (2013.01)

(52) U.S. Cl.
CPC .................................. *G06F 21/577* (2013.01)

(58) Field of Classification Search
CPC ....................................................... G06F 21/577
USPC ...................................................... 726/22–25
See application file for complete search history.

(56) References Cited

U.S. PATENT DOCUMENTS

| | | | | |
|---|---|---|---|---|
| 7,818,809 B1 * | 10/2010 | Sobel et al. | ..................... | 726/26 |
| 8,413,251 B1 * | 4/2013 | Gibney et al. | ................... | 726/26 |
| 2010/0031315 A1 * | 2/2010 | Feng et al. | ........................ | 726/3 |
| 2011/0041182 A1 * | 2/2011 | Stenfelt | .......................... | 726/23 |

OTHER PUBLICATIONS

Evans et al., Google Online Security Blog, Google Chrome Security Team, http://googleonlinesecurity.blogspol.coml20_11_/06ltry-ing-to-end-mixed-scripUng.html, Jun. 16, 2011.

* cited by examiner

*Primary Examiner* — Anthony Brown
(74) *Attorney, Agent, or Firm* — Lerner, David, Littenberg, Krumholz & Mentlik, LLP

(57) ABSTRACT

A universal indicator may be provided to users accessing content over a network to help the users identify which content is safe and which content is not. The indicator may be a positive indicator for safe sites, or a negative indicator for unsafe sites, and may be conspicuously positioned on a portion of the browser to alert users which Internet sites are safe. The positive icon may be displayed only if all of a predetermined set of criteria are met, wherein the predetermined criteria consider network vulnerabilities, server vulnerabilities, and unscrupulous business practice vulnerabilities.

20 Claims, 6 Drawing Sheets

SYSTEM AND METHOD FOR INDICATING SECURITY

BACKGROUND OF THE INVENTION

Online shopping can be dangerous, and many less technically savvy users have trouble navigating the complicated practice of determining which websites are safe and which aren't. Even otherwise safe websites can be compromised by network attackers. Secure Socket Layer (SSL) connections exist to protect users against network attackers, but understanding the presence and implication of a compromised SSL connection is difficult for inexperienced users. For example, in a browser commonly used today, there may be 13 or more icons and additional possible error messages related to website identity verification.

Even sites with secure network connections may be malicious (e.g., phishing sites) or compromised (e.g., legitimate sites that have been hacked). Site blacklists such as those used by Google Safe Browsing and Zscaler's Safe Shopping identify sites that may be phishing or hacked sites, but this is done separately from any network connection warnings.

Even sites that have secure network connections and are neither entirely malicious nor compromised may be unreliable or untrustworthy.

SUMMARY

One aspect of the disclosure provides a method for indicating a level of network security, the method comprising receiving a request to access content of the network and determining, using a processor (1) whether the network over which the content is accessed includes vulnerabilities; (2) whether a server through which the content is provided includes vulnerabilities; and (3) whether any reports of unscrupulous business activities are associated with the content. If each of the determinations by the processor is negative, a first indicator is selected. If any of the determinations by the processor are positive, a second indicator is selected. The selected indicator may then be transmitted for display.

According to some examples, determining whether the network over which the content is accessed includes vulnerabilities may comprise determining whether the content meets a predetermined set of network security criteria. For example, the predetermined set of network security criteria may comprise: (1) the content has a current, active SSL certificate encrypting a connection between a source of the content and a client device; (2) the content is using an approved encryption algorithm to encrypt the connection; and (3) the content does not have mixed scripting. Moreover, determining whether a server through which the content is provided includes vulnerabilities may comprise determining whether the content is included on a safe-browsing blacklist. Determining whether any reports of unscrupulous business activities are associated with the content may comprise at least one of determining whether the content is listed on a site whitelist, wherein the site whitelist identifies businesses that have been verified, and determining whether information associated with the content is included in spam e-mails.

Another aspect of the disclosure provides a device for indicating a level of security. The system comprises a memory storing information for indicating the level of security, and a processor coupled to the memory. The processor may be configured to receive a request to access content of the network, determine whether the network over which the content is accessed includes vulnerabilities, determine whether a server through which the content is provided includes vulnerabilities, and determine whether any reports of unscrupulous business activities are associated with the content. Further, the processor may select a first indicator if each of the determinations by the processor is negative, or select a second indicator if any of the determinations by the processor are positive. The processor may further transmit the selected indicator for display.

Yet another aspect of the disclosure provides a tangible, computer-readable storage medium on which computer readable instructions of a program are stored, the instructions, when executed by a processor, cause the processor to perform a method of indicating a level of network security. The method may comprise receiving a request to access content of the network, determining whether the network over which the content is accessed includes vulnerabilities, determining whether a server through which the content is provided includes vulnerabilities, determining whether any reports of unscrupulous business activities are associated with the content, selecting a first indicator if each of the determinations by the processor is negative, selecting a second indicator if any of the determinations by the processor are positive, and transmitting the selected indicator for display.

DETAILED DESCRIPTION

A universal indicator may be provided to users accessing content over a network to help the users identify which content is safe and which content is not. In one example, the indicator may be an icon conspicuously positioned on a portion of the browser to alert users which Internet sites are safe. The indicator may be one of two icons—a positive icon for safe sites, or a negative icon for unsafe sites. The positive icon may be displayed only if all of a predetermined set of criteria are met, wherein the predetermined criteria consider network vulnerabilities, server vulnerabilities, and unscrupulous business practice vulnerabilities.

Figure 1:
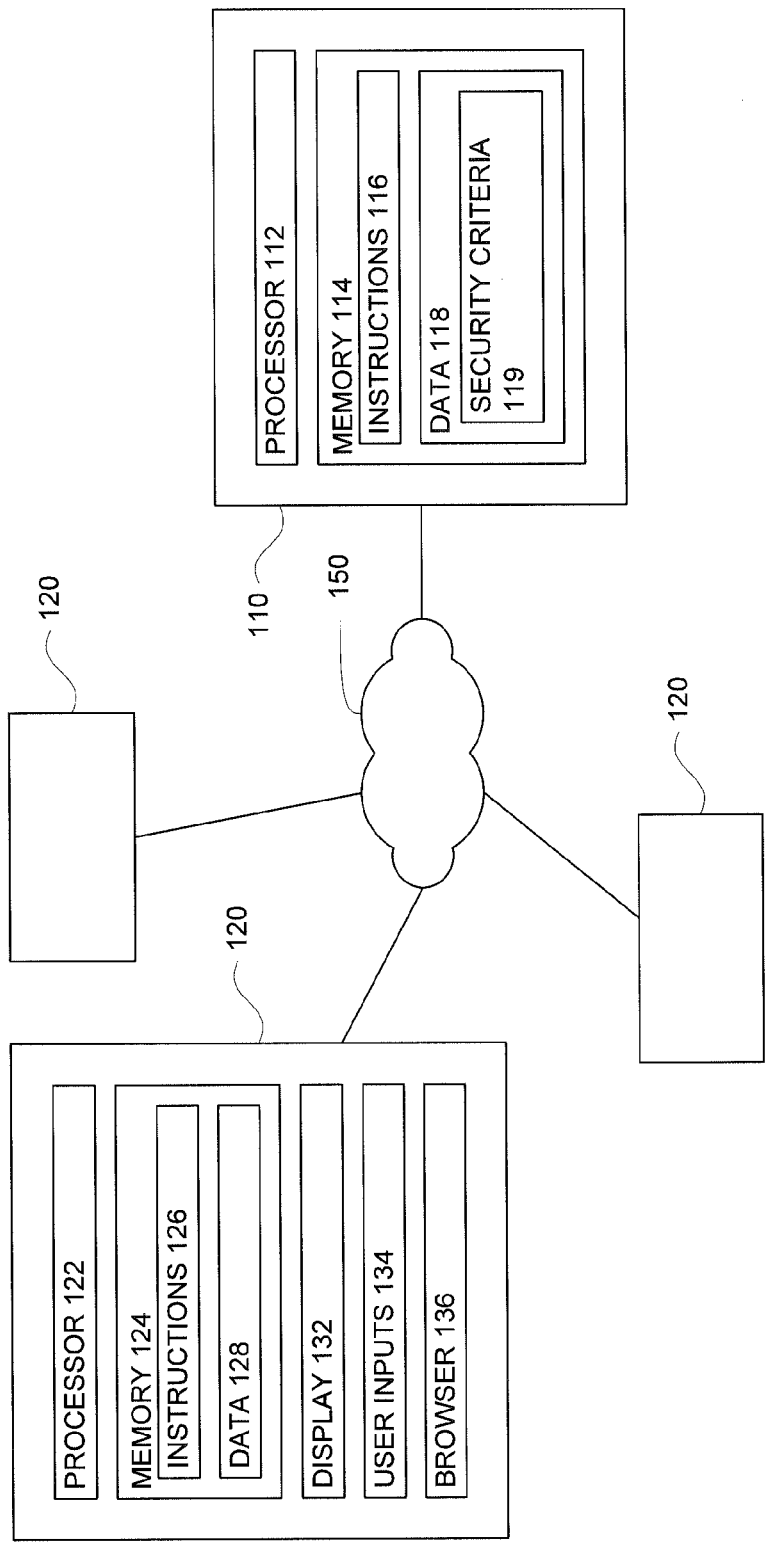
FIG. 1 is a functional diagram of a system in accordance with aspects of the disclosure.
Figure 2:
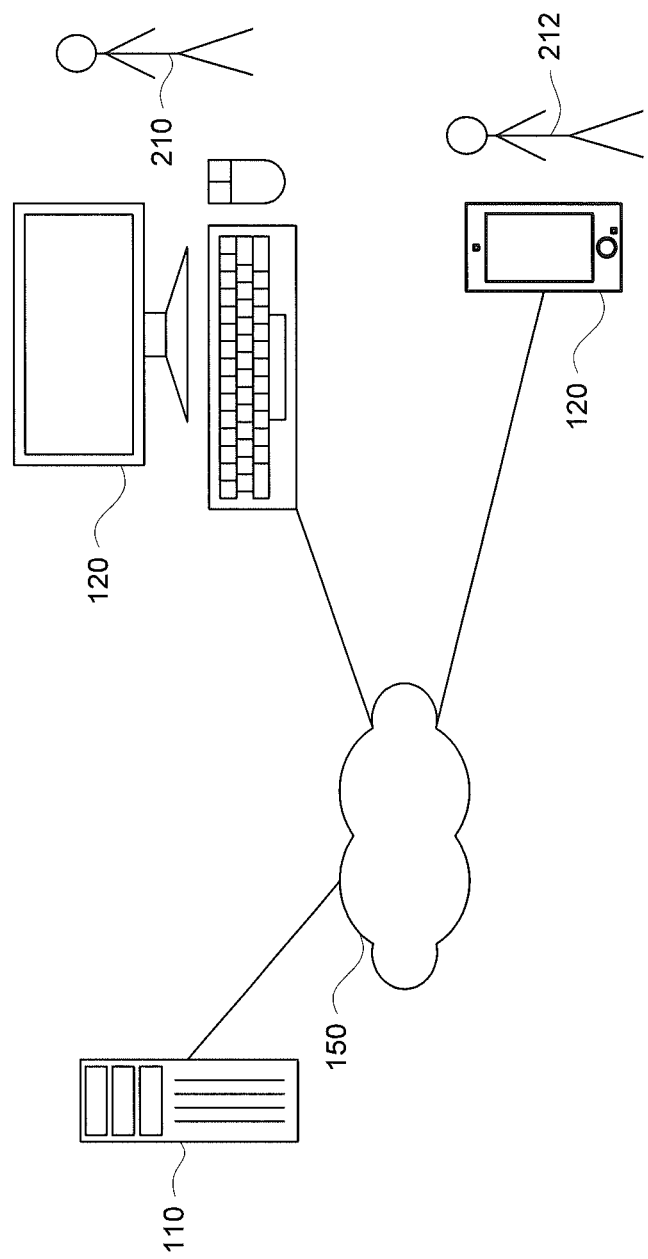
FIG. 2 is a pictorial diagram of the system of FIG. 1.

FIGS. 1-2 illustrate an example of a system 100 for providing a universal indicator to a user, such as users 210, 212. The system 100 may comprise a server 110 and one or more client devices 120 coupled to a network 150. The user 210, 212 may access content through the network 150 via the client device 120. The client device 120 may display an icon or other indicator to the user 210, 212 to indicate whether it is safe to access the content and/or enter personal information. Information used to determine whether it is safe to access the content may be provided by the server 110.

As shown in FIGS. 1-2, the system 100 may include the computers 110, 120. The computer 110 may be a server containing a processor 112, memory 114 and other components typically present in general purpose computers. Memory 114 of computer 110 may store information accessible by processor 112, including instructions 116 that may be executed by the processor 112.

The memory 114 may also include data 118 that may be retrieved, manipulated or stored by the processor. The memory may be of any type capable of storing information accessible by the processor, such as a hard-drive, memory card, ROM, RAM, DVD, CD-ROM, write-capable, and read-only memories.

The instructions 116 may be any set of instructions to be executed directly (such as machine code) or indirectly (such as scripts) by the processor. In that regard, the terms "instructions," "application," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 118 may be retrieved, stored or modified by processor 112 in accordance with the instructions 116. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

The processor 112 may be any conventional processor, such as commercially available CPUs. Alternatively, the processor may be a dedicated device such as an ASIC or other hardware-based processor. Although FIG. 1 functionally illustrates the processor, memory, and other elements of computer 110 as being within the same block, it will be understood by those of ordinary skill in the art that the processor, computer, or memory may actually comprise multiple processors, computers, or memories that may or may not be stored within the same physical housing. For example, memory may be a hard drive or other storage media located in a housing different from that of computer 110. Accordingly, references to a processor, computer, or memory will be understood to include references to a collection of processors, computers, or memories that may or may not operate in parallel.

The computer 110 may be at one node of a network 150 and capable of directly and indirectly communicating with other nodes, such as computers 120 of the network. The network 150 and intervening nodes described herein, may be interconnected using various protocols and systems, such that each may be part of the Internet, World Wide Web, specific intranets, wide area networks, or local networks. These may use standard communications protocols or those proprietary to one or more companies, Ethernet, WiFi and HTTP, and various combinations of the foregoing.

The computer 110 may comprise a web server capable of communicating with client devices 120. For example, in response to a request originating from client devices 120, the server 110 may send information such as web page content to the client devices for display to the users 210 or 212. Server 110 may also comprise a plurality of computers, e.g., a load balanced server farm, that exchange information with different nodes of a network for the purpose of receiving, processing and transmitting data to the client devices. In this instance, the client devices will typically still be at different nodes of the network than any of the computers comprising server 110.

Each client device 120 may be configured similarly to the server 110, with a processor 122, memory 124, instructions 126, and data 128 (similar to processor 112, memory 114, instructions 116, and data 118). Each client device 120 may be a personal computer, intended for use by a user 210, 212, having all the components normally found in a personal computer such as a central processing unit 122 (CPU), display device 132 (for example, a monitor having a screen, a projector, a touch-screen, a small LCD screen, a television, or another device such as an electrical device that is operable to display information processed by the processor), CD-ROM, hard-drive, user inputs 134 (for example, a mouse, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, network computers lacking local storage capability, set-top boxes for televisions, and other networked devices. The client devices 120 may further include a browser 136 or other utility for accessing the network. For example, the browser 136 may be an Internet browser, such as Chrome, Safari, Firefox, Internet Explorer, etc. According to another example, the browser 136 may be an interface for content-specific applications, such as apps for shopping, banking, social networking, media downloading, etc.

Although the computers 120 may comprise a full-sized personal computer, the system and method may also be used in connection with mobile devices capable of wirelessly exchanging data with a server over a network such as the Internet. By way of example only, client device 120 may be a wireless-enabled PDA, hand-held or in-car navigation device, tablet PC, netbook, or a cellular phone capable of obtaining information via the Internet. The user may input information, for example, using a small keyboard, a keypad, or a touch screen.

Returning to the server 110 of FIG. 1, the server 110 may be a dedicated server for identifying secure or insecure content. According to another example, however, the server 110 may be a source of the requested content (e.g., a web server hosting a particular web site). According to yet another example, the determination of whether particular content is secure may be made at the client computer 120. For example, the client computer 120 may collect information regarding the security of the network, the security of the site being accessed, and the business practices of the site being accessed from one or more sources available through the network.

The instructions 116 may include instructions for determining whether particular content is considered "safe" or not, selecting an indicator associated with the determination, and transmitting the indicator over the network 150. Thus, for example, if the user 210 types a URL into the browser 136, the server 110 may determine if the web page at that URL is "safe" and transmit an appropriate icon for display in the browser 136.

According to one example, determining whether the content is safe may comprise determining whether a predefined set of security criteria 119 is met. The security criteria may consider potential network vulnerabilities, potential server vulnerabilities, and potential business practice vulnerabilities associated with the requested content.

The potential network vulnerabilities may concern the security of the network connection between the client computer 110 and a source of the requested content. For example, a given site may only be determined to have a secure network connection if: (1) it has a current, trusted, active Secure Socket Layer (SSL) certificate encrypting the connection, or it has an Extended Validation (EV) SSL certificate; (2) it is using trusted encryption algorithms to encrypt the connection; (3) it does not have mixed scripting; and (4) it does not have any other mixed site content. Mixed scripting may include a web page which loads a script, stylesheet (e.g., cascading style sheet (CSS)), or plug-in resource. An attacker, such as someone on the same wireless network, can typically intercept the resource load and gain full access to the website loading the resource. Other mixed site content may include a web page which loads an image, iFrame, or font over HTTP. An attacker can again intercept the resource load, but normally can affect the appearance of the page.

The potential server vulnerabilities may concern the security of the content server which is providing the requested content. To determine the security of the server, the server 110 may determine whether the content server is reported as having vulnerabilities. For example, the server 110 may consult one or more safe-browsing "blacklists," which include websites reported as having vulnerabilities. The blacklists may be created using information from user complaints, cloud services that scan sites for known vulnerabilities, or the like. Examples of safe-browsing blacklists include Google's Safe Browsing List or Zscaler's Safe Shopping List. Alternatively or additionally to consulting blacklists, a site may be scanned for directory listing pages that report the type and version of the web server running the site. If that version of the web server has a known security bug, this information may be noted.

The potential business practice vulnerabilities may concern a reliability of a store and/or a quality of its customer service. For example, a site's shipping records may be checked for reliability. According to another example, the server 110 may consult a site "whitelist," such as Google's Trusted Stores. Such a whitelist may identify particular sites as "trusted" if a legitimacy of the site has been verified. For example, if the site is a shopping site, it may be verified that the site satisfactorily fulfills orders placed therethrough, and that credit card or other sensitive information entered at the site is not routinely compromised. Site may be placed on a whitelist based on, for example, shipping records (e.g., from UPS or FedEx), user reviews (e.g., user ratings or Better Business Bureau reviews), customer service responses to such review, or other information. As a further example, it may be determined whether the URL for the requested site includes a domain which sends spam e-mails. Such information may be logged in a particular place (e.g., site-quality blacklists, such as SURBL.org).

If it is determined that the requested content is not associated with any network vulnerabilities, server vulnerabilities, or business practice vulnerabilities, an icon or other indicator signifying that the requested content is secure may be selected and transmitted to the client device 120. However, if the content is associated with any type of vulnerability, an indicator signifying that the content is not secure may be selected and transmitted.

Figure 3:
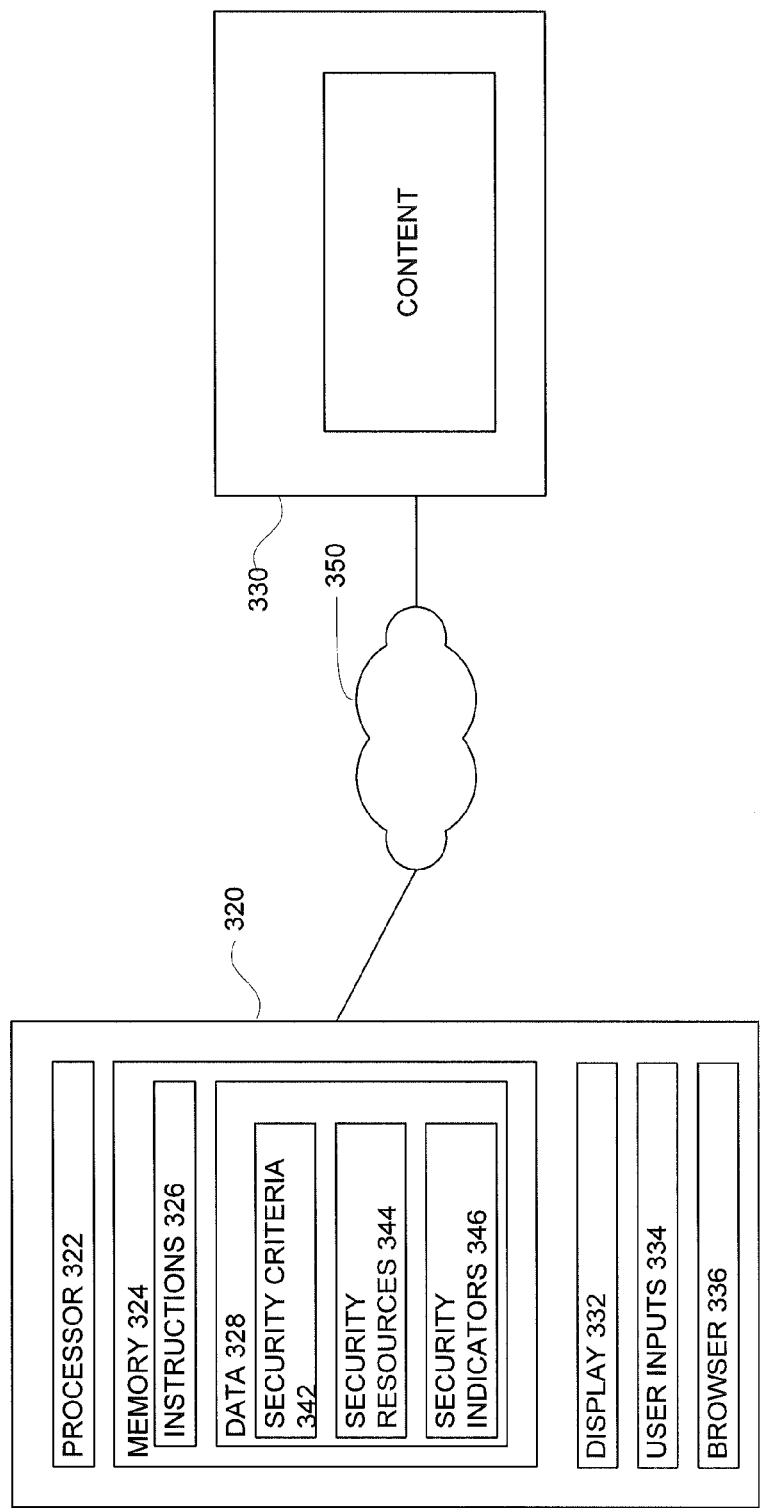
FIG. 3 is a functional diagram of another system in accordance with aspects of the disclosure.

While the determinations of whether particular content is secure is described above as being performed at the server 110, according to another example these determinations may be made at the client device 120, either alone or in combination with the server 110. For example, FIG. 3 illustrates a client device 320 in communication with a web server 330 via a network 350.

The client device 320 may include all of the components of the client device 120, such as a processor 322, memory, 324, display 332, user inputs 334, browser 336, etc. In addition, the client device 320 may include data 328, such as security criteria 342, security resources 344, and security indicators 346.

The security criteria 342 may comprise a predefined set of criteria to be met by a requested web site. The criteria may relate to network vulnerabilities, server vulnerabilities, and business practice vulnerabilities. For example, the security criteria 342 may include the same considerations as the security criteria 119 discussed above in connection with FIG. 1.

The security resources 344 may include information utilized to determine whether the requested site meets the security criteria 342. For example, the security resources 344 may include SSL certificates for particular sites, safe-browsing blacklists, whitelists of trusted sources, site quality blacklists, etc. This information may be gathered from one or more sources over the network 150 and stored in the memory 324. This information may also be updated periodically to ensure an accuracy of the determination of whether the requested site is secure. For example, the security resources 344 may be updated weekly, daily, hourly, or each time access to a particular web site is requested.

The security indicators 346 may include icons or other indicia for signifying to a user whether the requested web site is secure or not. According to one example, various pairs of security indicators (e.g., one for indicating that the site is secure and one for indicating that it is not) may be stored. In this regard, a user may select which pair of indicators is to be displayed, and thereby customize his browser 336.

Figure 4:
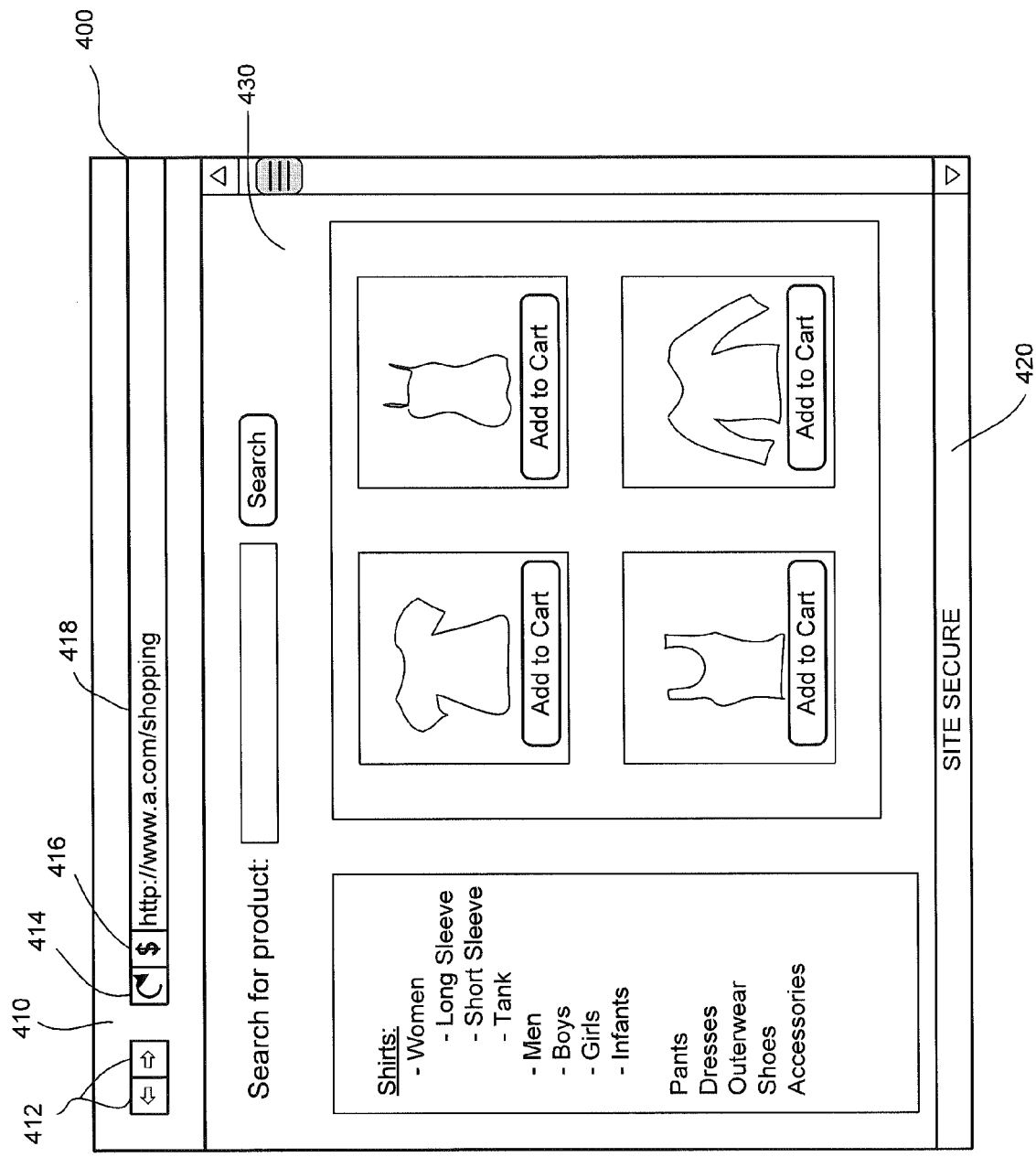
FIG. 4 is an example screenshot in accordance with aspects of the disclosure.
Figure 5:
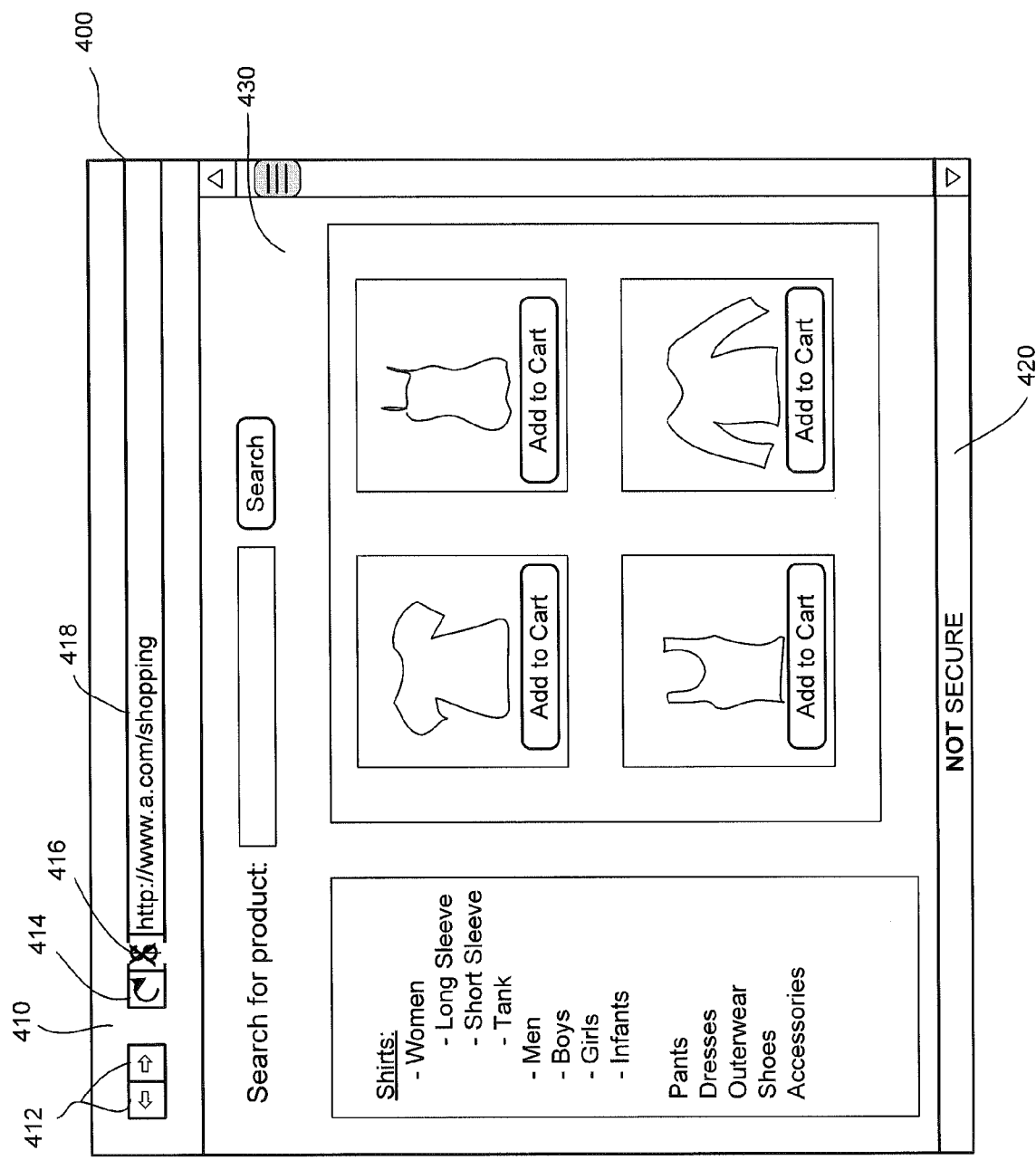
FIG. 5 is another example screenshot in accordance with aspects of the disclosure.

FIGS. 4-5 provide examples of a browser 400 including indicators of safe or unsafe web pages. The browser 400 may include a banner portion 410, which is displayed to the user regardless of what is displayed in content portion 430. The banner portion 410 may include features commonly found in browsers, such as navigational buttons 412, refresh button 414, and address bar 418. According to one example, the banner portion 410 may also include a security indicator icon 416.

The security indicator icon 416 may display one of two symbols for indicating whether a given site is secure or not secure. By way of example only, the icon 416 may include a large green dollar sign, as shown in FIG. 4, to indicate to the user that it is safe to shop or enter personal information at this site. Alternatively, the icon 416 may include a large red "X" over the green dollar sign, as shown in FIG. 5, to indicate that vulnerabilities were detected in connection with the site.

According to some aspects, the user may click the icon 416 to ascertain more detailed information on the security of the site. For example, clicking the icon 416 may provide information as to which security checks the site passed and/or which security checks it did not pass. Based on such information, a more technically savvy user may determine whether or not to continue visiting the site, making a transaction, or entering personal information.

While the security indicator icon 416 is shown in FIGS. 4-5 as being positioned adjacent the address bar 418, it should be understood that the icon 416 may be displayed in any conspicuous portion of the browser. Moreover, the security indication need not be displayed in the form of an icon at all, but rather the level of security may be displayed in a different way. For example, a security banner 420 may be displayed along a portion of the browser, such as at a bottom of the content portion 430. The security banner 420 may use text to inform the user whether the site is determined to be secure (FIG. 4) or not secure (FIG. 5). According to an even further example, the security determination may be indicated to the user by changing a color of a portion of the browser 400. For example, the banner portion 410 may be highlighted green if the site is secure, and red if it is not. Alternatively or additionally, a green or red outline may appear around the content portion 430 to indicate security. According to some aspects, two or more different mechanisms of indicating security may be used. Further, the mechanisms for indicating security may be selected by the user.

In some examples, the icon 416 or other indicator may be universal across all browsers and/or other platforms for accessing content over a network. Thus, for example, regardless of which browser (Chrome, Safari, etc.) is used, the user will receive a consistent indication of security.

Figure 6:
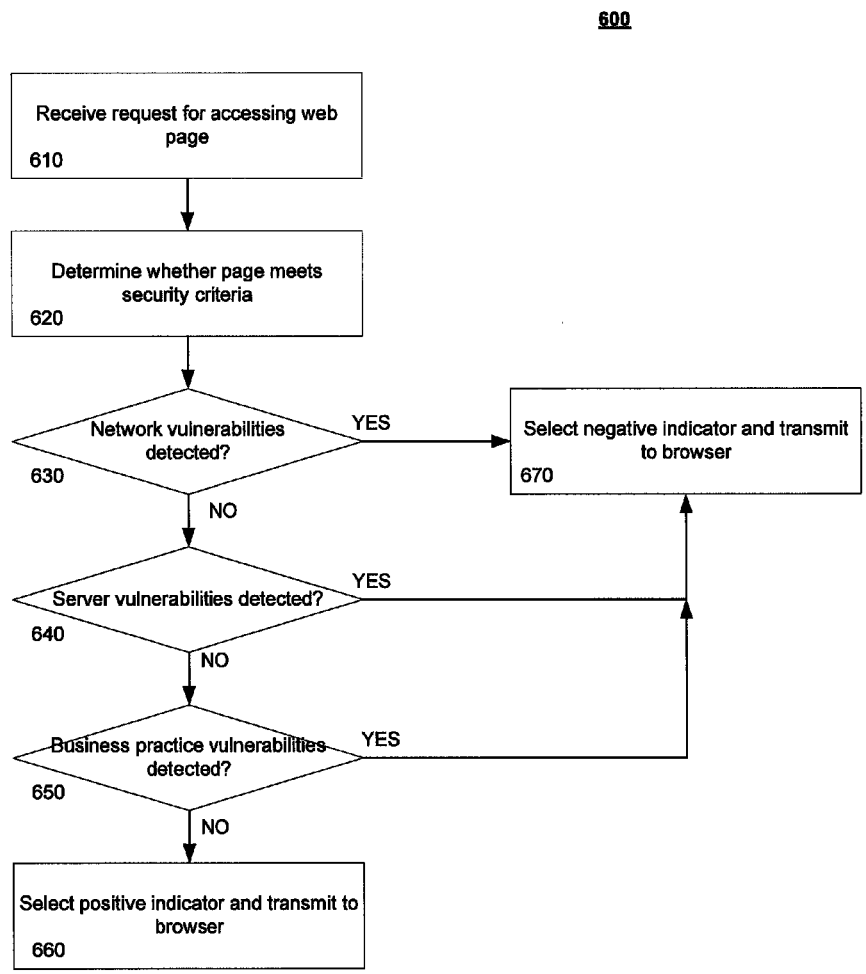
FIG. 6 is a flow diagram of a method in accordance with aspects of the disclosure.

FIG. 6 provides a flow diagram illustrating a method 600 for providing a security indication. For example, a client device may access a web page or other content over a network, such as the Internet. The client device may display an indication to the user of whether that web page is secure or not. The method 600 may be performed by the client device, a dedicated security server, a network server, or any combination of these. While various stages of the method are illustrated and described in a particular order, it should be understood that these stages do not have to be performed in this order. Rather, various stages may be handled in a different order or simultaneously, and stages may also be added or omitted unless otherwise stated.

In block 610, a request for accessing a web page is received. For example, a user may type a URL into an address bar of a browser. In the examples where the security determinations are performed by an entity other than the client device, this URL may be transmitted to that entity.

In block 620, it may be determined whether the page meets a predefined set of security criteria. This security criteria addresses various aspects of security and various potential vulnerabilities. These vulnerabilities may be individually addressed, such as in blocks 630-650.

In block 630, it is determined whether any network vulnerabilities are detected. The potential network vulnerabilities may concern the security of the network connection between the client computer 110 and a source of the requested content. Many different aspects of network vulnerabilities may be assessed, and in some example, all of these aspects must be determined to be secure. By way of example only, a given site may only be determined to have a secure network connection if: (1) it has a current, trusted, active Secure Socket Layer (SSL) certificate encrypting the connection, or it has an Extended Validation (EV) SSL certificate; (2) it is using trusted encryption algorithms to encrypt the connection; (3) it does not have mixed scripting; and (4) it does not have any other mixed site content.

In block 640, it is determined whether any server vulnerabilities are detected. The potential server vulnerabilities may concern the security of the content server which is providing the requested content. To determine the security of the server, the server 110 may determine whether the content server is reported as having vulnerabilities. For example, the server 110 may consult one or more safe-browsing "blacklists," which include websites reported as having vulnerabilities. The blacklists may be created using information from user complaints, cloud services that scan sites for known vulnerabilities, or the like. These blacklists may be created and maintained by the entity determining the server security, or they may be retrieved from other sources.

In block 650, it is determined whether any unscrupulous business practice vulnerabilities are detected. The potential business practice vulnerabilities may concern a reliability of a store and/or a quality of its customer service. For example, for an Internet shopping web site, the site's shipping records may be checked for reliability. According to another example, the server 110 may consult a site "whitelist," such as Google's Trusted Stores, which identifies particular trusted sites. Alternatively or additionally, consumer reports may be checked for complaints regarding non-receipt of an order placed, a disconnected customer service telephone number, a false customer service e-mail address, or the like. As a further example, it may be determined whether the URL for the requested site appears in spam e-mails, which may be logged in a particular place (e.g., SURBL.org).

If a vulnerability is detected in any of blocks 630-650, a negative indicator may be selected in block 670. The negative indicator may be any type of indicator that clearly signifies to a user that the requested web page is not secure. For example, the indicator may be an icon of an exclamation point or a dollar sign with a large red "X" over it. As a further example, the indicator may be a banner with text indicating that the page is not secure, a color-coding or highlighting of the browser or content portions displayed in the browser, or any combination of these. The negative indicator may be provided to the browser for conspicuous display to the user.

If no vulnerabilities are detected in any of blocks 630-650, a positive indicator may be selected in block 660. Similar to the negative indicator, the positive indicator may be any type of indicator that clearly signifies to a user that the requested web page is secure, that it is therefore safe to enter sensitive information, such as an address, password, credit card number, etc. For example, the indicator may be an icon of a large green dollar sign, a banner with text indicating that the page is secure, a color-coding or highlighting of the browser or content portions displayed in the browser, or any combination of these. The positive indicator may be provided to the browser for conspicuous display to the user.

According to one example, once a web page is determined to be secure r not secure, a record of this determination may be maintained for future use. For example, if the user attempted to access the same URL the next day, the client device may consult the list (locally stored or stored at a server and accessible over the network), rather than performing all the determinations again. Further, this list may be updated periodically to maintain its accuracy. For example, the list may be updated daily, weekly, each time a given URL is requested, each $3^{rd}$ time the given URL is requested, etc.

While the method 600 has been described with respect to accessing a web page, it should be understood that this method may be applied to any content accessed over a network, including documents, application data, or the like. Such content is not limited to content where users purchase goods or services, or enter sensitive information. Moreover, such content may be accessed over any network, including the Internet, a wide area network, a local area network, a virtual private network, etc. Even further, the positive or negative security indicator may be provided to any interface or application used to access the content, including content-specific apps, e-mail applications, media download applications, or the like.

The aspects described above may benefit users in that they provide a comprehensive determination of whether a given site is secure, addressing all aspects of security and potential vulnerabilities. Moreover, from the user's perspective, deciding whether a site is safe, and whether to therefore proceed with entering sensitive information, is greatly simplified.

Rather than trying to decipher a broad range of indicia with many different meanings, the user may simply defer to the positive or negative security indicator. This is particularly true if the security indicator is universal across all browsers and other network access platforms.

As these and other variations and combinations of the features discussed above can be utilized without departing from the subject matter defined by the claims, the foregoing description of the embodiments should be taken by way of illustration rather than by way of limitation of the subject matter defined by the claims. It will also be understood that the provision of the examples described herein (as well as clauses phrased as "such as," "including" and the like) should not be interpreted as limiting the invention to the specific examples; rather, the examples are intended to illustrate only one of many possible embodiments. Further, the same reference numbers in different drawings may identify the same or similar elements.

The invention claimed is:

1. A method for indicating a level of network security, the method comprising:
   receiving a request to access content of the network;
   determining, using a processor:
      whether the network over which the content is accessed includes vulnerabilities;
      whether a server through which the content is provided includes vulnerabilities; and
      whether, based on consumer reports, a business associated with the content is unreliable, the consumer reports including shipping records, user reviews, and responses by the business's customer service;
   selecting a first indicator if each of the determinations by the processor is negative;
   selecting a second indicator if any of the determinations by the processor are positive; and
   transmitting the selected indicator for display.

2. The method of claim 1, further comprising maintaining a record of the determinations made by the processor.

3. The method of claim 2, further comprising periodically updating the record.

4. The method of claim 1, wherein the indicator is universal across a plurality of different browsers.

5. The method of claim 1, wherein the first indicator and second indicator are selectable by a user.

6. The method of claim 1, further comprising providing detailed information regarding the determinations made by the processor.

7. The method of claim 1, wherein determining whether the network over which the content is accessed includes vulnerabilities comprises determining whether the content meets a predetermined set of network security criteria.

8. The method of claim 7, wherein the predetermined set of network security criteria comprises:
   the content has a current, active SSL certificate encrypting a connection between a source of the content and a client device;
   the content is using an approved encryption algorithm to encrypt the connection; and
   the content does not have mixed scripting.

9. The method of claim 1, wherein determining whether a server through which the content is provided includes vulnerabilities comprises determining whether the content is included on a safe-browsing blacklist.

10. The method of claim 9, further comprising downloading the safe-browsing blacklist.

11. The method of claim 1, wherein determining whether any reports of unscrupulous business activities are associated with the content comprises at least one of:
   determining whether the content is listed on a site whitelist, wherein the site whitelist identifies businesses that have been verified; and
   determining whether information associated with the content is included in spam e-mails.

12. The method of claim 1, wherein the determining is performed at a user device.

13. A device for indicating a level of security, the system comprising:
   a memory storing information for indicating the level of security; and
   a processor coupled to the memory and configured to:
      receive a request to access content of the network;
      determine whether the network over which the content is accessed includes vulnerabilities;
      determine whether a server through which the content is provided includes vulnerabilities;
      determine whether, based on consumer reports, a business associated with the content is unreliable, the consumer reports including shipping records, user reviews, and responses by the business's customer service;
      select a first indicator if each of the determinations by the processor is negative;
      select a second indicator if any of the determinations by the processor are positive; and
      transmit the selected indicator for display.

14. The device of claim 13, wherein the device is a client device.

15. The device of claim 13, wherein the device is a server.

16. The device of claim 13, wherein the first indicator and the second indicator are icons.

17. The device of claim 13, wherein the first indicator and the second indicator are banners including text.

18. The device of claim 13, wherein the information stored in the memory for indicating the level of security includes resources associated with the requested content.

19. The device of claim 18, wherein the resources comprise at least one of safe-browsing blacklists, site whitelists, consumer reports, and reports of spam e-mails.

20. A non-transitory computer-readable storage medium on which computer readable instructions of a program are stored, the instructions, when executed by a processor, cause the processor to perform a method of indicating a level of network security, the method comprising:
   receiving a request to access content of the network;
   determining whether the network over which the content is accessed includes vulnerabilities;
   determining whether a server through which the content is provided includes vulnerabilities;
   determining whether, based on consumer reports, a business associated with the content is unreliable, the consumer reports including shipping records, user reviews, and responses by the business's customer service;
   selecting a first indicator if each of the determinations by the processor is negative;
   selecting a second indicator if any of the determinations by the processor are positive; and
   transmitting the selected indicator for display.

* * * * *